United States Patent [19]

Hall

[11] 3,825,759

[45] July 23, 1974

[54] GAMMA RAY DETECTOR WITH CHANNEL LIMITING MEANS

[75] Inventor: Robert N. Hall, Schenectady, N.Y.

[73] Assignee: General Electric Company, Schenectady, N.Y.

[22] Filed: Oct. 24, 1972

[21] Appl. No.: 299,922

[52] U.S. Cl......... 250/370, 317/235 AD, 317/235 N

[51] Int. Cl............................................... G01t 1/24

[58] Field of Search......... 317/235, 235 AD, 235 N; 250/460, 370, 371, 395, 389

[56] References Cited

UNITED STATES PATENTS

| | | | |
|---|---|---|---|
| 3,116,183 | 12/1963 | Pell | 317/235 |
| 3,117,229 | 1/1964 | Friedland | 250/370 |
| 3,225,198 | 12/1965 | Mayer | 250/371 |
| 3,413,528 | 11/1968 | Llacer | 317/234 |
| 3,414,780 | 12/1968 | Diebold | 317/235 |
| 3,501,678 | 3/1970 | Schuler | 250/370 |

*Primary Examiner*—Lawrence James W.
*Assistant Examiner*—Harold A. Dixon
*Attorney, Agent, or Firm*—Jerome C. Squillaro; Joseph T. Cohen; Julius J. Zaskalicky

[57] ABSTRACT

High purity germanium gamma ray detectors are provided with at least one, and preferably a plurality, of lateral channel-limiting regions which prevent the short-circuiting of a substantial portion of the lateral surface of the detectors by spurious channels of conductivity-type opposite to that of the residual conductivity-type of the germanium.

12 Claims, 4 Drawing Figures

GAMMA RAY DETECTOR WITH CHANNEL LIMITING MEANS

Figure 1:
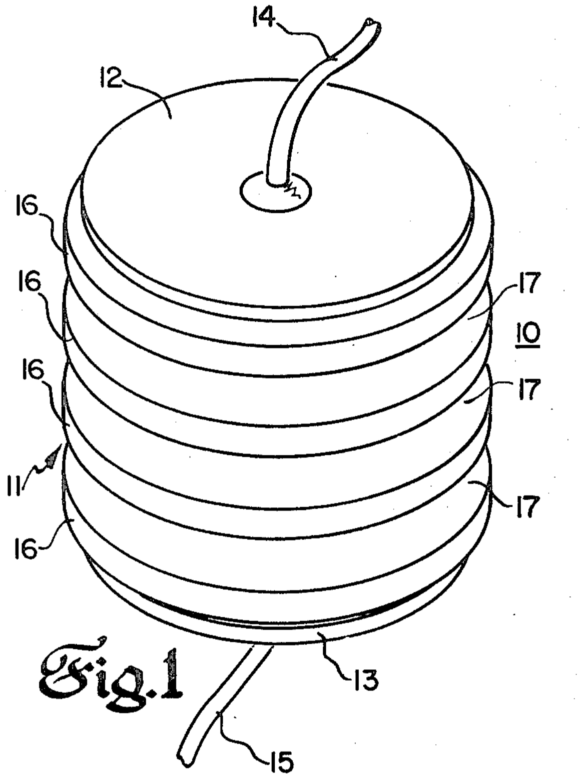

The present invention relates to improved gamma ray detectors. More particularly, the invention relates to semiconductor gamma ray detectors, generally of germanium, which include additional structural means to provide protection against distortion of the surface electric fields and lowering of the detector efficiency. This invention was made under or in relation to a contract with the Atomic Energy Commission.

High purity germanium particle detectors, such as gamma ray detectors, are in essence a body of exceedingly high purity germanium material wherein a thick depletion region may be established by high reverse bias so as to be exceedingly sensitive to the passage of a small quantity of high energy particles therethrough. Basically, such devices generally include, for example, a body of high purity germanium having a relatively thick, intrinsic or near-intrinsic, (herein referred to generally as "substantially intrinsic") region with a donor or $N^+$ surface-adjacent region at one major surface thereof, and an acceptor, or $P^+$ surface-adjacent region at the opposite major surface thereof. Such devices are ordinarily operated at ambient temperatures of from 4° K to 200° K, most generally at approximately 77° K.

Most recent developments in the preparation of such detectors have been primarily directed to the processing of the semiconductor material, e.g., germanium, in order that the residual, or uncompensated, electrically significant impurities, primarily donors and acceptors, may be reduced to the practicable minimum so as to obtain germanium having the highest purity and the greatest freedom from free-charge inducing impurity states in the substantially intrinsic region between the donor and acceptor surface-adjacent regions. As examples of such developments, processing techniques directed to the elimination of residual acceptor activators and the minimizing of residual donor activators have been disclosed and claimed in my prior U.S. Pat. Nos. 3,573,108 and 3,671,330, and my co-pending U.S. Pat. application Ser. No. 229,490, filed Feb. 25, 1972, now U.S. Pat. No. 3,761,711 assigned to the assignee of this invention and incorporated herein by reference thereto.

As used herein, the term "donor" generally refers to donor activator impurities of Group V of the Periodic Table of the Elements, and as used herein, the term "acceptor" generally refers to the conventional acceptor activators of Group III Of the Periodic Table of the Elements. Such impurities add substitutional states to the germanium and induce shallow levels very close to the conduction and valence band edges respectively. In addition to the foregoing, the interstitial impurity lithium is generally also regarded as a donor impurity and is particularly effective in such devices.

One serious problem in semiconductor gamma ray detectors, principally germanium detectors, is that of surface leakage. Such leakage provides a background signal which adversely affects the sensitivity and effectiveness of such detectors. Most of such leakage current is a result of spurious surface-adjacent inversion layers, or "channels" which form due to impurities or surface states. Such channels result not only in excessive leakage currents, but their presence also causes a distortion of the electric field distribution in the detector and greatly decreases the sensitive volume of the detector.

Accordingly, it is an object of the invention to provide semiconductor gamma ray detectors with improved sensitivity.

Another object of the invention is to provide semiconductor gamma ray detectors with greatly decreased leakage current characteristics.

Still another object of the invention is to provide a structure for gamma ray detectors which is more rugged and less susceptible to physical damage by virtue of surface abrasions and the like.

Briefly stated, in accord with one embodiment of the invention, an improved semiconductor gamma ray detector includes a body of high purity semiconductor material such as germanium and thin heavily-doped $N^+$ and $P^+$ electrode regions at opposite major surfaces thereof. The lateral surface of the germanium body between the $N^+$ and $P^+$ regions is surrounded by a plurality of isolated narrow channel limiting regions which are heavily doped with the same type of activator impurity as controls the residual conductivity of the germanium body. Portions of the semiconductor surface between the heavily doped regions are physically removed and depressed so as to make them less accessible to abrading contacts and more resistant to damage therefrom. The channel limiters prevent gross surface-inversion and the establishment of spurious channels of any substantial effect and results in a substantially uniform electric field distribution throughout the detector and a sensitive volume including substantially the entire volume of the detector.

The novel features believed characteristic of the invention are set forth in the appended claims. The invention itself, together with further objects and advantages thereof, may best be understood by reference to the following detailed description of the invention taken in connection with the appended drawing in which FIG. 1 is a perspective view of a semiconductor gamma ray detector in accord with the present invention, and FIGS. 2*a*, 2*b*, and 2*c* are schematic representations of the field distribution in an ideal germanium gamma ray detector, a germanium gamma ray detector with a surface-inversion channel and a typical germanium gamma ray detector constructed in accord with the present invention.

Figure 2A:
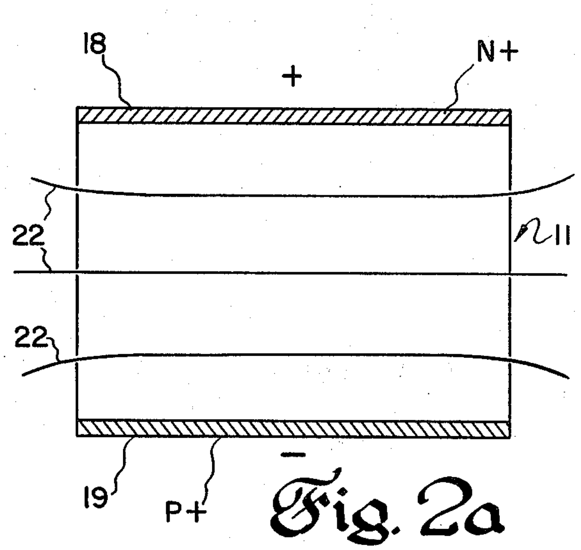
Figure 2B:
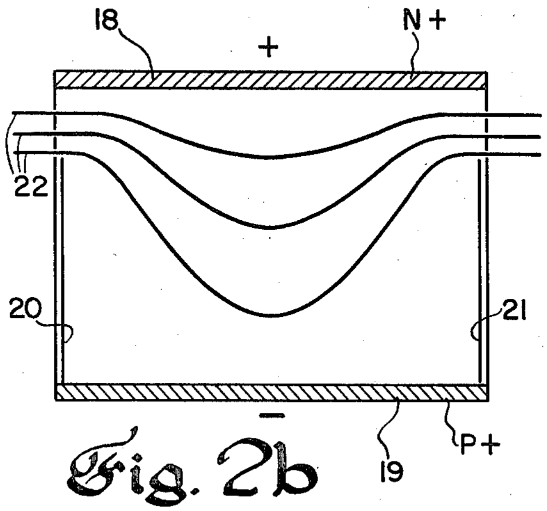
Figure 2C:
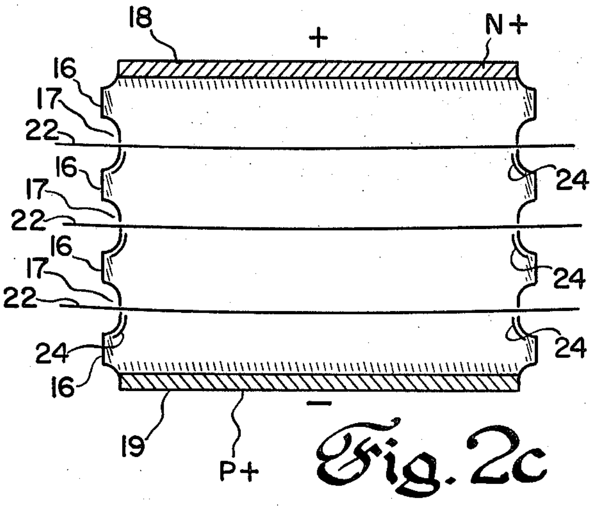

In FIG. 1, gamma ray detector 10 includes a semiconductor body 11, which for purposes of illustration is represented as cylindrical, having a pair of contact electrodes 12 and 13 at opposite major surfaces thereof, and a pair of electrical contacts in the form of wires 14 and 15 leading thereto and providing means for impressing a reverse bias thereto. The lateral sides of the germanium body 11 comprise a plurality of larger diameter channel limiting ridges 16 between which the remaining portions of the original surface of the base germanium body are physically and chemically grooved to form a plurality of lesser diameter recesses 17 with ridges 16 and grooves 17 alternating so that ridges 16 are electrically isolated from one another and from contacts 12 and 13 respectively. The germanium body which comprises the main portion of the semiconductor gamma ray detector in accord with the present invention comprises germanium which is highly purified so as to remove all but an absolute and practicable minimum of uncompensated electrically active impurities therein. Such removal may be achieved as is set forth in detail in the aforementioned patents and application. Typically, germanium semiconductor base materials comprise germanium having an excess of uncompensated donor or activator impurities of the order of $10^{10}$, or less, but preferably $10^9$ per $cm^3$ thereof, or less. Donor and activator, or $N^+$ and $P^+$ contact regions illustrated in FIG. 2*a* at 18 and 19, respectively, are formed in the surface-adjacent regions of opposite major surfaces of the base semiconductor body. Such an $N^+$ region may be formed by the deposition of lithium by vacuum evaporation or by electrolysis, as is disclosed in my co-pending U.S. Pat. application Ser. No. 299,921 filed Oct. 24, 1972 assigned to the assignee of the present invention. Lithium is preferred as a donor activator for the formation of such $N^+$ regions although other donor activators may be used. Boron is preferred as an acceptor activator for the formation of a $P^+$ region in such devices. Such boron may conveniently be deposited as, for example, by diffusion or by the ion implantation thereof. Although boron is a preferred acceptor activator for electrode region 19, it is understood that other conventional acceptors of Group III of the Periodic Table of the Elements are equally useful and form operative devices. The concentration of donors and acceptors in the $N^+$ and $P^+$ regions respectively is generally of the order of $10^{16}$ atoms per $cm^3$ or greater.

Channel-limiting regions contained in ridges 16 of FIG. 1 are formed by the deposition into the surface-adjacent region of the germanium body, a high concentration of the same type of activator impurity as represents the residual conductivity type of the germanium semiconductor base material. Thus, for example, if the residual conductivity of the germanium body is N-type, the channel limiting regions may be formed by the deposition into the channel limiting regions of the semiconductor body of a concentration of approximately $10^{16}$ atoms per $cm^3$ of lithium. The depth of deposition of such donor is generally the same depth as that of the donor, or $N^+$ contact region, namely, approximately from 0.1 mm to 1.0 mm. Alternatively, if the base conductivity type of the germanium body is P-type, as indicated by a residual concentration of uncompensated acceptors, the channel limiting regions may be formed by the deposition therein of a concentration of approximately $10^{16}$ atoms per $cm^3$, or higher, thereof of boron. Conveniently, the channel limiting regions and the contact region of the same conductivity may, for example, be deposited at the same time.

In general, in one example of fabrication, a high purity germanium body having an activator excess concentration of $10^{10}$ or less per $cm^3$, contained therein, is processed, as for example, as described in U.S. Pat. application Ser. No. 299,921 to cause a sufficient concentration of the same type donor activator as, for example, lithium, to be in the lateral surface-adjacent region and one end surface-adjacent region of a residual N-type germanium body. The body is then partially masked so as to cover the surface portions at which the channel limiting regions are to be formed and the intermediate regions are either physically or chemically reduced in diameter as, for example, by sand-blasting or etching, then further etched to remove surface states, and the structure of FIG. 1 with the interposed grooves and ridges is achieved. Either prior or subsequent thereto, the opposite major surface is provided with an appropriately thin (0.1 to 1.0 mm) deposition of the opposite conductivity inducing activator (in the above example, boron) to a concentration of approximately $10^{16}$ atoms per $cm^3$, or greater, preferably by ion implantation, in the case of boron.

Electrical contact is made to contact regions 18 and 19 by the contacting thereof with a thin film of indium which may be readily applied by known techniques such as evaporation or mechanical pressure at room-temperature, and an electrical contact member represented by wires 14 and 15 affixed thereto, as, for example, by soldering or brazing.

In FIG. 2*a* of the drawing, the electrical characteristics and the field distribution, as indicated in an ideal situation, are illustrated. With an electric voltage applied, as indicated by the plus and minus signs, to contact regions 18 and 19, a uniform, parallel distribution of potential lines or equipotential contours 22 exists within the body 11 of the germanium, applying a reverse bias thereto. Under these circumstances, the entire body is highly stressed and is very sensitive to the passage of highly charged particles, such as gamma rays, therethrough. Normal field gradients within such devices are generally of the order of 1,000 volts per cm and may go as high as several thousands of volts per cm.

FIG. 2*b* of the drawing illustrates the deleterious results of extended spurious channels caused by surface inversion or impurities. In FIG. 2*b*, channels 20 and 21 comprise P-type regions extending from the heavily doped $P^+$ acceptor region 19 upwardly along the lateral surface of the germanium body. Such P channels in the normally weakly N-type germanium body cause a constriction of the potential lines 22 so that the voltage gradient in the remaining surface portions of the germanium body greatly increases inversely in proportion to the proportion of the original surface remaining. As may be seen from FIG. 2*b*, the intense concentration of the electric field at the lateral surface tends to cause a great amount of distortion, leaving only a relatively small proportion of the total volume of the germanium body which has an appropriate field distribution for particle detection. In the limit, as the channel increases, the effective field concentration within the body approaches zero and the effectiveness of the detector is substantially negated. Simultaneously with the constriction of the electric field, the leakage count also increases.

In FIG. 2*c*, the field distribution obtainable in devices in accord with the invention is illustrated. In FIG. 2*c*, the channel limiting regions 16, which are interspaced between the grooves 17 having the original characteristics of the surface of the base germanium body, are heavily impregnated with activator impurities of the same conductivity type as the residual conductivity of the base germanium. Thus, residual channels, or channelettes, 24 which tend to form along the surface of the base germanium, may proceed only as far as the next channel limiting region and are terminated. These small channelettes 24 are essentially ineffective to affect the potential distribution which, as illustrated by equipotential lines 22, closely approximates the ideal situation as illustrated in FIG. 2*a*, thus preserving the entire body of the germanium semiconductor for the establishment of a high field region and being highly sensitive to the passage of charged particles such as gamma rays and the detection thereof.

In addition to the foregoing, since the ridges 16 are not actually of the base germanium having the high purity and do not participate in the detection processes, the abrasion, chipping, or other physical damage which may occur thereto by contact with other harder bodies, or by normal usage, does not affect the field disribution within the body, as would be the case if the surface of the active region of the substantially intrinsic portion of the semiconductor body were so damaged. Thus, in addition to obtaining great electrical advantage, the present invention also yields additional mechanical advantage which secondarily preserves the electrical integrity of detectors in accord with the invention.

In the foregoing description, a circular, horizontal, cross-sectional geometry has been utilized as an example of the physical structure of a gamma detector in accord with the invention. This is purely for explanatory purposes, however, and any suitable geometry as, for example, square, rectangular, elliptical, or other horizontal cross-sectional geometries, may be utilized.

As a practical matter, devices constructed in accord with the present invention may vary in size from approximately one-half cm between the major surfaces with a major radial dimension (diameter or width) of approximately 1 cm up to a thickness of 2 to 3 cms. and a width or diameter of 5 or 6 cms., or even larger, depending on the application to which the device is to be applied. Normally, however, the depth of diffusion or other deposition within the active germanium body to provide both electrode regions and channel limiting regions is of the order of 0.01 to 1.0 mm., irrespective of the other device dimensions.

I am aware that channel guard rings and other similar instrumentalities have been used in silicon discrete and integrated circuitry to reduce surface leakage currents between diffused electrode regions and contact. These instrumentalities generally consist of $P^+$ regions diffused into the neutral P-type silicon substrate and serve to interrupt the N-type channel which tends to form. The converse is often the case in that $N^+$ regions may be diffused into a neutral N-type substrate to interrupt a P-type channel. Such guard rings are not utilized in a high field region of a device as in this particular application and no relationship to the tailoring of the electric field distribution within the bulk of a device is contemplated or achieved. Thus, such instrumentalities have no relationship to the channel limiting regions of the gamma ray detectors in accord with the present invention.

In summary, in accord with the present invention, I provide a new structure for gamma ray detectors wherein the lateral surface of the active region of a germanium detector is provided with a plurality of heavily doped annular rings, or their analogs in other geometrical structures, which are electrically isolated and which divide the active surface into a series of equipotential rings. Each ring is able to intercept and interrupt any spurious channel caused by surface inversion of the semiconductor surface so that the voltage applied to the detector is divided among the several heavily diffused channel limiters. Thus, leakage current is greatly reduced and the resultant electric field within the body of the germanium active region of the detector is made to be nearly uniform, as is the field along the surface, as compared with the pinched-off type field distribution at the surface which would occur in the absence of channel limiting regions in accord with the present invention.

While the invention has been set forth herein with respect to certain specific embodiments and particular characteristics thereof, many modifications and changes will readily occur to those skilled in the art. Accordingly, by the appended claims it is intended to cover all such modifications and changes as fall within the true spirit and scope of the foregoing disclosure.

What I claim as new and desire to secure by Letters Patent of the United States is:

1. A high energy semiconductor particle detector comprising:

a. a high purity monocrystalline semiconductor body having a substantially intrinsic active region with residual conductivity characteristic of one type;

b. a first electrode region at one major surface of said body, said electrode region including a surface adjacent region heavily doped with activator impurities of said one conductivity type;

c. a second electrode region at the remaining opposite major surface of said body, said electrode region including a surface-adjacent region heavily doped with activator impurities of opposite conductivity type;

d. at least one channel limiting region laterally surrounding the periphery of said semiconductor body at the said active region thereof and substantially parallel to said electrode regions;

$d_1$. said channel limiting region including a surface-adjacent region of limited longitudinal dimension and being doped with activator impurities of said one conductivity type to a degree sufficient to provide a barrier within said surface-adjacent region to spurious channels of opposite conductivity type extending from said opposite conductivity type electrode region under operating voltage bias.

2. The particle detector of claim 1 wherein a plurality of said lateral channel limiting regions are interposed at substantially equidistant intervals along said active region of said semiconductor body.

3. The particle detector of claim 2 wherein said particle detector is of generally right cylindrical structure with an axial dimension which is small as compared with its diameter.

4. The particle detector of claim 2 wherein said first and second electrode regions are contacted with a metallic film which provides means for impressing an electric field to said detector.

5. The particle detector of claim 4 wherein said electric field is of the order of at least 1,000 volts per cm.

6. The particle detector of claim 2 wherein the surface of said semiconductor body intermediate said channel limiting regions and intermediate between said regions and said electrode regions is of lesser radial dimension than said dimension of said channel limiting regions.

7. The particle detector of claim 2 wherein said semiconductor body is germanium having a concentration of excess uncompensated electrically active impurities no greater than the order of $10^{10}$ per $cm^3$.

8. The particle detector of claim 7 wherein said electrode regions have a concentration of excess donor activator impurities of at least $10^{16}$ per $cm^3$ in said first electrode region and a concentration of excess acceptor impurities of at least $10^{16}$ per $cm^3$ in said second electrode region.

9. The particle detector of claim 8 wherein said germanium body has an excess of uncompensated donor activators and is residually N-type and said activator impurities in said channel limiting regions are donors.

10. The particle detector of claim 8 wherein said germanium body has an excess of acceptor activator impurities and is residually P-type and said activator impurities in said channel limiting regions are acceptors.

11. The particle detector of claim 10 wherein said donor activator in said first electrode region and said donor impurity in said channel limiting regions are both lithium.

12. The particle detector of claim 11 wherein said acceptor activator in said second electrode region and said acceptor activator in said channel limiting region are both boron.

* * * * *